United States Patent
Zider et al.

(10) Patent No.: US 9,239,469 B2
(45) Date of Patent: Jan. 19, 2016

(54) EYEGLASSES

(71) Applicant: Beta Frames LLC, Menlo Park, CA (US)

(72) Inventors: Robert B. Zider, Portola Valley, CA (US); John F. Krumme, Woodside, CA (US); Brian A. Thompson, Byron, CA (US)

(73) Assignee: BETA FRAMES LLC, Menlo Park, CA (US)

( * ) Notice: Subject to any disclaimer, the term of this patent is extended or adjusted under 35 U.S.C. 154(b) by 0 days.

(21) Appl. No.: 14/742,539

(22) Filed: Jun. 17, 2015

(65) Prior Publication Data
US 2015/0286065 A1    Oct. 8, 2015

Related U.S. Application Data

(63) Continuation of application No. 13/668,730, filed on Nov. 5, 2012, now Pat. No. 9,086,581, which is a
(Continued)

(51) Int. Cl.
G02C 1/02    (2006.01)
G02C 1/00    (2006.01)
G02C 13/00   (2006.01)

(52) U.S. Cl.
CPC ......... *G02C 1/023* (2013.01); *G02C 1/10* (2013.01); *G02C 13/001* (2013.01)

(58) Field of Classification Search
CPC ............ G02C 1/02; G02C 1/023; G02C 1/04; G02C 1/06; G02C 1/10; G02C 2200/06
USPC ......... 351/90–92, 110, 140, 154, 159.01, 178
See application file for complete search history.

(56) References Cited

U.S. PATENT DOCUMENTS

| 2,851,925 A | 9/1958 | Cretin-Martenaz |
| 3,639,044 A | 2/1972 | Blair |

(Continued)

FOREIGN PATENT DOCUMENTS

| DE | 212187 | 7/1909 |
| DE | 213310 | 9/1909 |

(Continued)

OTHER PUBLICATIONS

European Patent Office Search Report and Opinion dated Jul. 23, 2012, are for European application 06815436.
(Continued)

*Primary Examiner* — Huy K Mai

(57) ABSTRACT

Eyeglass assemblies include an eyeglass lens having an engaging portion. The junction between the body portion of the lens and the engaging portion can consist essentially of smoothly curved surfaces. The engaging portion can be extend from the periphery of the lens or can be a recess in the lens. In some assemblies, under typical conditions of use, the engaging portion is maintained in contact with an eyeglass frame member by means of a removable bonding member (RBM). Under selected atypical ambient conditions, the RBM changes so that the engaging portion and the frame member can be separated. The RBM can be a suitable adhesive (RBA), or a component composed of a shape memory metal (RBSMA) or a material which softens when subjected to heat or other atypical condition.

16 Claims, 6 Drawing Sheets

Related U.S. Application Data continuation of application No. 12/083,140, filed as application No. PCT/US2006/037433 on Jul. 28, 2010, now Pat. No. 8,322,849.

(60) Provisional application No. 60/724,186, filed on Oct. 6, 2005, provisional application No. 60/817,228, filed on Jun. 27, 2006.

(56) References Cited

U.S. PATENT DOCUMENTS

| | | | |
|---|---|---|---|
| 3,824,006 | A | 7/1974 | Volt |
| 3,846,017 | A * | 11/1974 | Ferrell ............ G02C 1/023 16/228 |
| 4,679,918 | A | 7/1987 | Ace |
| 4,895,438 | A | 1/1990 | Zider |
| 4,896,955 | A | 1/1990 | Zider |
| 5,189,447 | A | 2/1993 | Oleson |
| 5,452,028 | A | 9/1995 | Iijama |
| 5,640,217 | A | 6/1997 | Hautcoeur |
| 5,805,259 | A | 9/1998 | Chao |
| 5,861,933 | A | 1/1999 | Bac |
| 5,865,940 | A | 2/1999 | Li |
| 6,164,775 | A | 12/2000 | Zider |
| 6,250,755 | B1 | 6/2001 | Conner |
| 6,288,170 | B1 | 9/2001 | Waid |
| 6,394,599 | B1 | 5/2002 | Blanvillain |
| 6,523,952 | B1 | 2/2003 | Krumme |
| 6,752,893 | B2 | 6/2004 | Frieder |
| 6,805,441 | B1 | 10/2004 | Loniak |
| 6,827,439 | B1 | 12/2004 | Chen |
| 6,843,561 | B2 | 1/2005 | Krumme |
| 7,066,594 | B2 | 6/2006 | Loniak |
| 7,588,331 | B2 | 9/2009 | Burnstein |
| 8,322,849 | B2 * | 12/2012 | Krumme ............ G02C 1/023 351/110 |
| 9,086,581 | B2 * | 7/2015 | Zider ............... G02C 1/023 1/1 |
| 2005/0139309 | A1 | 6/2005 | Savoie |
| 2005/0157253 | A1 | 7/2005 | Thiele |
| 2005/0253999 | A1 | 11/2005 | Lermer |
| 2006/0082722 | A1 | 4/2006 | Rapp |
| 2006/0139565 | A1 | 6/2006 | Jannard |
| 2006/0250570 | A1 | 11/2006 | Friedman |
| 2007/0091255 | A1 | 4/2007 | Pilat |
| 2008/0304005 | A1 | 12/2008 | DiChiara |
| 2009/0051866 | A1 | 2/2009 | DiChiara |

FOREIGN PATENT DOCUMENTS

| | | |
|---|---|---|
| DE | G9402861 | 7/1994 |
| DE | U 9406002.9 | 10/1994 |
| DE | 10320270 | 7/2004 |
| DE | 2006 01700 | 10/2007 |
| EP | 0790519 | 8/1997 |
| FR | 2504282 | 10/1982 |
| FR | 2749088 | 11/1997 |
| FR | 2766587 | 1/1999 |
| FR | 2828744 | 2/2003 |
| JP | 11-183851 A | 7/1999 |
| KR | 20-0164601 Y1 | 2/2000 |
| KR | 20-0217876 Y1 | 3/2001 |
| KR | 20-0376512 Y1 | 3/2005 |
| WO | WO 99/53360 | 10/1999 |
| WO | WO 00/26715 | 5/2000 |
| WO | WO 02/095482 | 11/2002 |
| WO | WO 2005/029159 | 3/2005 |

OTHER PUBLICATIONS

European Patent Office Communication dated Nov. 22, 2013 for European application 06815436.

European Patent Office Communication dated Feb. 2010 for European application 06815436.

Dymax Corporation—low stress plastic bonders, acrylics styrene polycarbonate, Ultra Light Weld 3094 series.

Korean Patent Office Search Report and Opinion for PCT/US 2009/005202.

* cited by examiner

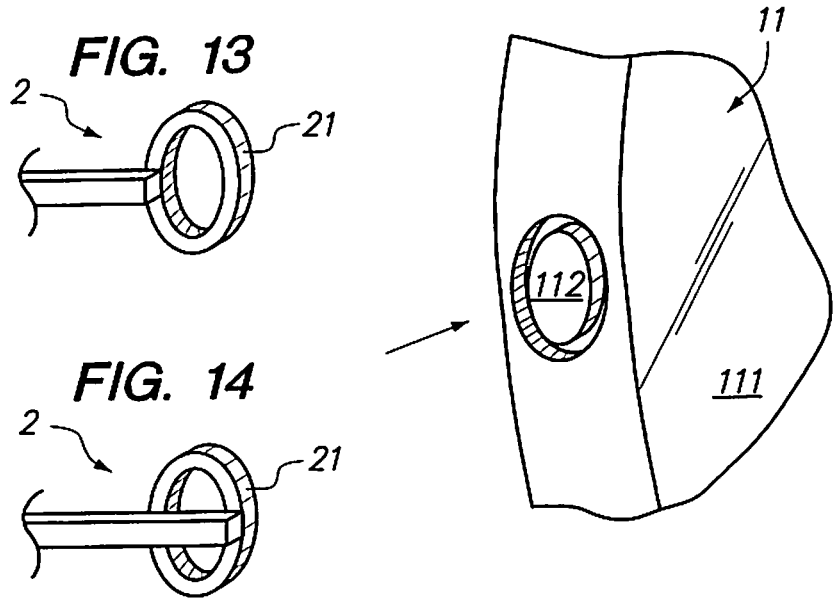
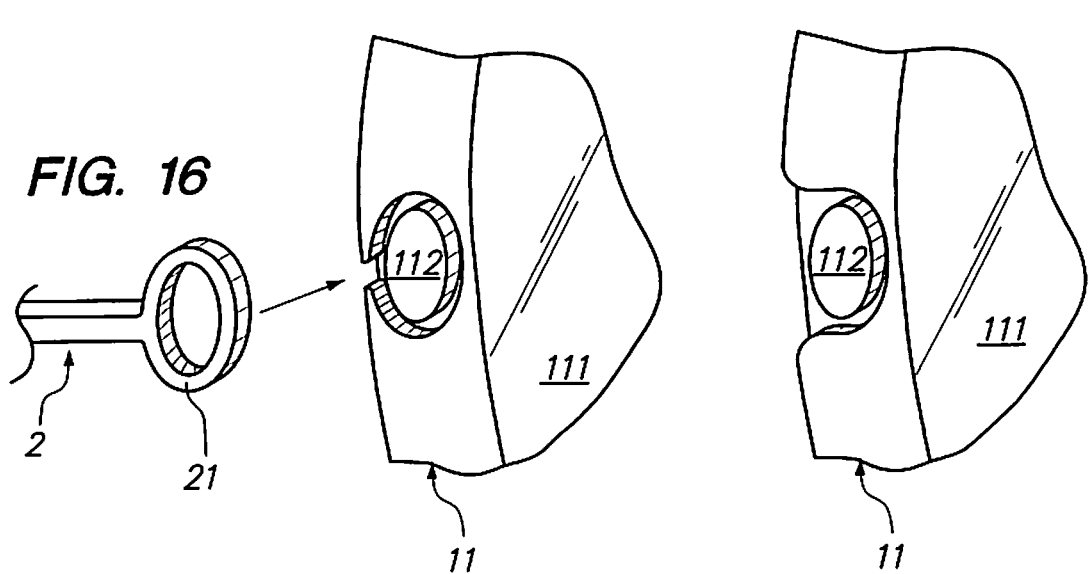

EYEGLASSES

CROSS-REFERENCE TO RELATED APPLICATIONS

This application is a continuation of application Ser. No. 13/668730, filed Nov. 5, 2012. Application Ser. No. 13/668730 is a continuation of application Ser. No. 12/083140, filed Jul. 28, 2010, now U.S. Pat. No. 8,322,849 issued Dec. 4, 2012. Application Ser. No. 12/083140, is an application under 35 USC 371 of International Patent Application No. PCT/US 06/037433, filed Sep. 27, 2006. International Patent Application No. PCT/US 06/037433 claims priority from U.S. provisional application No. 60/724,186, filed 6 Oct. 2005, and from U.S. provisional application No. 60/817,228, filed 27 Jun. 2006. This application claims priority from each of applications Ser. No. 13/668730, 12/083140, PCT/US 06/037433, 60/724186 and 60/817228. The entire disclosure of each of applications Ser. Nos. 13/668730, 12/083140, PCT/US 06/037433, 60/724186 and 60/817228 is incorporated herein by reference for all purposes.

BACKGROUND OF THE INVENTION

1. Field of the Invention

This invention relates to eyeglasses.

2. Introduction to the Invention

Conventional eyeglasses include a bridge member which rests on the nose of the wearer; two rims which are secured to the bridge member and to which the lenses are secured; and two temple members which are secured to the rims and rest on the ears of the wearer. In many cases, each rim has an opening therein, so that the lens can be placed within the rim, after which the open ends of the rim are secured together by means of a screw which passes freely through an aperture in a lug in one of the open ends into a threaded recess in a corresponding lug in the other open end. U.S. Pat. No. 6,164,775 discloses an improved system for attaching optical frames and lenses which provides positive, reversible attachment without rims, cords or screws. In that system, an eyeglass lens including at least one shaped engaging portion cooperates with an attachment member so that the lens is removably attached to an eyeglass frame. The attachment member can comprise a separate member which is connected or connectable to the eyeglass frame, or it can be an integral part of the eyeglass frame. U.S. Pat. Nos. 4, 895,438, 4,896,955, 6,523,952 and 6,843, 561 also disclose improved eyeglass frames, some of which make use of a member composed of a shape-memory alloy (often hereinafter abbreviated to SMA) and/or a lens including a shaped engaging portion. The entire disclosure of each of the five U.S. patents referred to above is incorporated herein by reference for all purposes.

SUMMARY OF THE INVENTION

A first discovery of the present invention is that, in an eyeglass assembly, an engaging portion on an eyeglass lens can be maintained in contact with an eyeglass frame member by means of a removable bonding member (RBM) which
  (a) contacts the engaging portion and the frame member; and
  (b) under typical conditions of use of the assembly, maintains the engaging portion and the frame member in direct or indirect contact with each other; and
  (c) under selected atypical ambient conditions, undergoes a change which separates the engaging portion and the frame member, or permits the engaging portion and the frame member to be separated from each other by pulling them apart manually.

The contacts referred to above between the engaging portion and the frame member, between the RBM and the engaging portion, and between the RBM and the frame member, can be direct or indirect contacts.

The terms "eyeglass frame member", "frame member" and "frame" are used herein to include temple members, bridge members, and auxiliary members to which a temple member or a bridge member is, or can be, secured. Such members can for example be composed of a metallic and/or polymeric material.

The term "removable bonding member" (often abbreviated to RBM) is used herein to denote a bonding member having characteristics (a), (b) and (c) of the first discovery of the present invention as defined above.

The term "selected atypical ambient conditions" is used herein to denote any condition which
  (i) is not present during the typical conditions of use of the eyeglass assembly,
  (ii) when applied to the RBM, causes the RBM to undergo a change which permits the engaging portion and the frame member to be separated from each other by pulling them apart manually, or which causes the engaging portion of the frame member to separate from each other, and
  (iii) does not involve the use of external mechanical force to change the physical configuration of the RBM, the engaging portion or the frame member, e.g. does not involve the turning of a screw or the mechanical opening of a latch.

The selected atypical ambient conditions preferably do not have any adverse effect on at least one of the eyeglass lens and the frame member. As indicated by the word "selected" in the term "selected atypical ambient conditions", different RBMs may require, or respond most desirably to, different atypical ambient conditions. However those skilled in the art will have no difficulty, having regard to their own knowledge and the disclosure herein, in selecting suitable atypical ambient conditions which will produce the desired result.

In some embodiments of the invention, the engaging portion on the eyeglass lens is an integral part of the lens, in which case the lens comprises (a) a body portion having a periphery, and (b) an engaging portion near the periphery. In other embodiments, the engaging portion is distinct from, but permanently secured to, the eyeglass lens.

As further described below, the RBM can for example comprise
  (1) an adhesive which lies between and contacts the engaging portion and the frame member, and whose adhesive strength is reduced by the selected atypical ambient conditions; such an adhesive is referred to herein as a removable bonding adhesive (often hereinafter abbreviated to RBA); and/or
  (2) a member comprising a component which comprises an SMA and which changes shape when exposed to the selected atypical ambient conditions; such a member is referred to herein as an RBSMA; and/or
  (3) a member comprising a component which melts, or whose physical strength is otherwise reduced, under the selected atypical ambient conditions; such a member is referred to herein as an RBS; and RBS can for example comprise a component composed of a solder or other composition which melts when heated.

A second discovery of the present invention is that it is useful to reduce the stresses in an engaging portion of an eyeglass lens, particularly when the engaging portion is an integral part of the lens.

A third discovery of the present invention is that it is useful to shape an engaging portion of eyeglass lens so that it has few or no stress risers, particularly when the engaging portion is an integral part of the lens.

A fourth discovery of the present invention is that the conventional screw fitting for securing the open ends of a rim surrounding a lens can be replaced by a fitting which comprises a removable closing member (RCM)

(d) which contacts the open ends of the rim and which, under typical conditions of use of the eyeglasses, maintains the open ends in a position which retains the lens in a desired position, and (e) when subjected to selected atypical ambient conditions, undergoes a change which permits the open ends to be separated from each other by pulling them apart manually.

In this specification, the term "removable closing member" (often hereinafter abbreviated to. RCM) is used to denote a closing member having characteristics (d) and (e) of the fourth discovery of the invention as defined above. The definition given above for "selected atypical ambient conditions" is also applicable to the fourth discovery of the invention, but applying it to the RCM rather than the RBM.

As further described below, the RCM can for example be an RBA, an RBSMA, or an RBS. In some embodiments, the RCM does no more than secure together the open ends of the rim, in which case the eyeglasses generally include conventional temple members secured to the rim. In other embodiments, the RCM provides an additional function, e.g. is at least part of a temple member. For example, the RCM can be an auxiliary member to which a temple member is, or can be, secured; or the RCM can be the terminal portion of a temple member which is monolithic or which comprises a plurality of parts which are secured together.

A fifth discovery of the present invention is that an eyeglass lens can be removably attached to an eyeglass rim by means of an adhesive which (f) contacts the periphery of the lens and the eyeglass rim, and which, under typical conditions of use of the eyeglasses, prevents the lens and the rim from being pulled apart manually, and (g) when subjected to selected atypical ambient conditions, undergoes a change which permits the lens and the rim to be separated from each other by pulling them apart manually.

The adhesives which are useful in this discovery are the adhesives which are referred to above as RBAs, and the selected atypical ambient conditions of those which are useful with RBAs.

A sixth discovery of the present invention is that an engaging portion on an eyeglass lens can be attached, preferably removably attached, to an associated eyeglass frame member by means of a suitable physical interlock between the engaging portion and frame member, without the need for a removable bonding member. For example, the eyeglass frame can slide into a recess in the engaging portion, or vice versa, or in some other way, an interference fit can be provided between the eyeglass frame and the engaging portion such that the engaging portion and frame member cannot be pulled apart under typical conditions of use of the eyeglasses, but can be pulled apart by pulling them in a direction which is unlikely to occur under typical conditions of use and/or by subjecting them to selected atypical ambient conditions which change the interference fit. In this discovery, the different coefficients of thermal expansion of different materials, e.g. a metal frame member and a polymeric engaging portion, can be utilized to assist in assembling and/or disassembling the engaging portion and frame member.

A seventh discovery of the present invention is that an engaging portion on an eyeglass lens can be removably attached to an eyeglass frame member by means of magnetic forces such that the lens and the frame member (i) under typical conditions of use of the eyeglasses, are maintained in contact with each other, but (ii) can be separated by atypical mechanical conditions (i.e. conditions which involve the application of mechanical forces which are not present under typical conditions of use of the eyeglasses), thus providing a "breakaway" characteristic which can be desirable, for example in eyeglasses used in sporting activities.

An eighth discovery of the present invention is that an engaging portion on an eyeglass lens can be removably attached to an eyeglass frame member by a retractable mechanical lock, e.g. a spring-loaded pin which extends from the frame member into a corresponding recess in the lens, or vice versa.

BRIEF DESCRIPTION OF THE DRAWINGS

The invention is illustrated in the accompanying drawings, which are diagrammatic and not to scale, and in which FIGS. 5-21 are perspective views of assemblies comprising an eyeglass lens and a frame member.

DETAILED DESCRIPTION OF THE INVENTION

Figure 1:
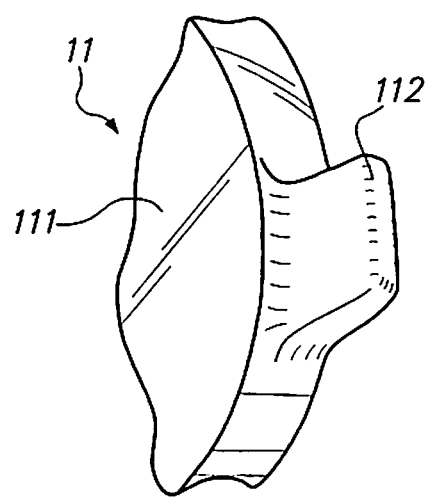
FIG. 1 is a partial perspective view of an example of an eyeglass lens.

In the Summary of the Invention above, the Detailed Description of the Invention below, and the accompanying drawings, reference is made to particular features of the invention (including for example components, ingredients, elements, groups, ranges, method steps etc.). It is to be understood that the disclosure of the invention in this specification includes all appropriate combinations of such particular features. For example, where a particular feature is disclosed in the context of a particular discovery, a particular aspect, a particular embodiment, a particular claim, or a particular Figure, that feature can also be used in connection with other particular discoveries, aspects, embodiments and Figures (except where the context excludes that possibility), and in the invention generally.

The term "comprises" and grammatical equivalents thereof are used herein to mean that other elements (i.e. components, ingredients, steps etc.) are optionally present. For example, an assembly "comprising" (or "which comprises") components A, B and C can contain only components A, B and C, or can contain not only components A, B and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term monolithic is used herein to denote an article which has the same composition throughout and in which any internal interfaces have substantially disappeared.

This specification incorporates by reference all documents referred to herein and all documents filed concurrently with this specification or filed previously in connection with this application, including but not limited to such documents which are open to public inspection with this specification.

A first preferred aspect of this invention is an eyeglass assembly comprising
(1) an eyeglass lens including an engaging portion;
(2) an eyeglass frame member; and
(3) an RBM as defined above.

A second preferred aspect of this invention is a method of making an assembly according to the first aspect of the invention, the method comprising
(A) positioning the engaging portion, the frame member, and a precursor of the RBM adjacent to each other; and
(B) after step (A), converting the precursor of the RBM into the RBM, thus securing the engaging portion and the frame member to each other.

Step (B) can involve (i) merely leaving the assembly at room temperature while the precursor is converted into the RBM, and/or (ii) subjecting the RBM to a treatment which causes, or accelerates, conversion of the precursor into the RBM, for example exposure to ultraviolet light or other electromagnetic radiation, and/or heating or cooling.

A third preferred aspect of this invention is a method of disassembling an assembly according to the first aspect of the invention which comprises subjecting the RBM to selected atypical ambient conditions, and separating the engaging portion and the frame member by pulling them apart manually.

A fourth preferred aspect of this invention is a monolithic eyeglass lens which is composed of a polymeric composition and which comprises a body portion and an engaging portion at least a part of which has been subjected to a treatment to relieve stresses. An eyeglass lens according to the fourth preferred aspect of the invention can be used in any way, including but not limited to the first, second and third aspects of the invention set out above, the sixth preferred aspect of the invention set out below, and the attachment arrangements and methods set out in the U.S. patents incorporated by reference herein.

A fifth preferred aspect of this invention is a method of making an eyeglass lens according to the fourth aspect of the invention, the method comprising subjecting a monolithic eyeglass lens which is composed of polymeric composition and which comprises a body portion and an engaging portion to a treatment which relieves stresses in at least part of the engaging portion.

A sixth preferred aspect of the invention is a monolithic eyeglass lens which is composed of a polymeric composition and which comprises a body portion and an engaging portion which is substantially free of configurations which are stress risers. An eyeglass lens according to the sixth preferred aspect of the invention can be used in any way, including but not limited to the first, second, third, fourth and fifth preferred aspects of the invention set out above, and the attachment arrangements and methods set out in the U.S. patents incorporated by reference herein.

A seventh preferred aspect of the invention is an eyeglass assembly which comprises
(1) an eyeglass lens,
(2) a rim which holds the lens in place and which comprises two open ends, and
(3) an RCM as defined above.

An eighth preferred aspect of the invention is an eyeglass assembly which comprises
(1) an eyeglass lens having a periphery, and
(2) a rim to which at least part of the periphery of the lens is secured by means of
(3) a removable bonding adhesive (RBA)
    (a) which contacts at least part of the periphery of the lens and at least part of the eyeglass rim, and which, under typical conditions of use of the eyeglasses, prevents the lens and the rim from being pulled apart manually, and
    (b) which, under selected atypical ambient conditions, undergoes a change which permits the lens and the rim to be separated from each other by pulling them apart manually.

A ninth preferred aspect of the present invention is an assembly comprising
(1) an eyeglass including an engaging portion, and
(2) an auxiliary member which is permanently secured to the engaging portion.

The auxiliary member can be, for example, a frame member, a nose pad, a support for a nose pad, an attachment member for a clip-on lens, or a support for an attachment member for a clip-on lens. The seventh aspect of the invention can make use of any eyeglass lens as defined, including but not limited to an eyeglass lens according to the fourth, fifth or sixth aspect of the invention set out above, or a body portion and/or engaging portion as set out in U.S. Pat. No. 6,164,775 incorporated by reference herein.

A tenth preferred aspect of the present invention is an assembly comprising
(1) an eyeglass lens comprising
    (a) a body portion having a periphery, and
    (b) an engaging portion near the periphery;
(2) an attachment member which is removably secured to the engaging portion, the attachment member of being one or more of a nose pad, a support for a nose pad, an attachment member for a clip-on lens, or a support for an attachment member for a clip-on lens.

Other preferred aspects of the invention include (1) methods of disassembling assemblies according to the seventh and eighth preferred aspects of the invention which comprise subjecting the assembly to selected typical ambient conditions and separating the lens from the rim; and novel lenses and frame members disclosed herein, including, but not limited to, lenses having engaging portions which comprise recesses, and frame members comprising a body portion and a terminal portion, the terminal portion for example being 0.2 to 1 inch (0.5 to 25 mm) long, and/or having a cross-section which has a different shape than the body portion, and/or having a cross-sectional area not more than 90%, for example not more than 75%, of the cross-sectional area of the adjacent body portion. The novel lenses of the invention include lenses which comprise engaging portions which are in the form of recesses extending from the periphery of the lens into the lens and having one or more of the features identified in paragraph (1) (b) below, particularly in subparagraphs (vi)-(ix). Frame members of the invention include frame members comprising components which will fit into recesses having one or more of the features identified in paragraph (1)(b) below, particularly in subparagraphs (vi)-(ix), for example components comprising a ring or part of a ring of circular or other appropriate shape.

The invention can optionally make use of the features set out above, and the features enumerated below, insofar as those features are applicable to the different aspects of the invention. The features set out above and enumerated below can optionally be present in any combination of two or more of those features, except when the features are mutually exclusive.

(1) Especially in the first to sixth, ninth and tenth preferred aspects of the invention, the engaging portion of the lens optionally comprises one or both of the following features.
   (a) It is a member projecting from the periphery, and/or from the front, and/or from the back, of the lens.
   (b) It is a recess in the lens. The recess can have one or more of the following features.
      (i) it extends through the thickness of the lens;
      (ii) it extends from the back of the lens but not through the front of the lens;
      (iii) it extends from the front of the lens but not through the back of the lens;
      (iv) it is wholly within the lens, so that the periphery of the lens is continuous;
      (v) it extends through the periphery of the lens, so that at most part of the periphery of the lens is continuous;
      (vi) it extends through the periphery of the lens and does not interrupt the front or the back of the lens;
      (vii) the periphery of the recess is smoothly curved, for example is in the shape of a circle or an oval;
      (viii) the periphery of the recess comprises at least one straight section, and optionally at least one smoothly curved section, for example is in the shape of a regular polygon, e.g. a square, or a rectangle;
      (ix) the recess includes a raised central portion; the height of the raised central portion can be less than, the same as, or greater than, the depth of the recess; the shape of the edge of the raised central portion can be the same as, or different from, the shape of the periphery of the recess; for example, the cross-section of the periphery can be a regular or irregular annulus.
(2) Especially in the first to sixth, ninth and tenth preferred aspects of the invention, the body portion and the engaging portion of the lens are monolithic, for example are produced by machining or otherwise shaping a block of optical material, for example a polycarbonate or like transparent polymeric material.
(3) Especially in the first to sixth, ninth and tenth preferred aspects of the invention, the engaging portion comprises a member which is permanently secured (including welded) to the body portion and which projects from the periphery or from the back or from the front of the lens.
(4) Especially in the first to sixth, ninth and tenth preferred aspects of the invention, the engaging portion and/or the frame member comprises at least one section which can be deformed, preferably elastically deformed, so that the engaging portion and the frame member are in contact with each other under typical conditions of use of the eyeglasses, but are at least partially disengaged from each other under the atypical ambient conditions.
(5) Especially in the first to sixth, ninth and tenth preferred aspects of the invention, the engaging portion comprises a substantially laminar, e.g. substantially planar, surface; the frame member comprises a substantially laminar, e.g. substantially planar, surface; and the laminar surfaces are maintained in contact with each other by a substantially laminar layer of an RBA between the surfaces, or by an RBSMA.
(6) Especially in the first to sixth, ninth and tenth preferred aspects of the invention, the engaging portion and/or the frame member comprises at least one physical feature which assists in placing them in a desired position relative to each other, for example features which permit sliding contact in one dimension only, and/or which prevent relative rotation of the engaging portion and the frame member when they are in a desired position relative to each other; and/or the engaging portion and/or the frame member comprises at least one physical feature which, when an RBSMA is used to prevent the engaging portion and the frame member from being pulled apart manually, (i) assists in the placement of the RBSMA when the RBSMA is in the form of the precursor, and/or (ii) assists the correct placement of the RBSMA as it is converted from the precursor into the RBM, and/or (iii) maintains the correct placement of the RBSMA after it has been converted into the RBM.
(7) Especially in the first to sixth, ninth and tenth preferred aspects of the invention, the engaging portion and/or the frame member include physical and/or compositional features which improve or accelerate the effect of the atypical ambient conditions. In some exemplary embodiments, the engaging portion and/for the frame member can include apertures, e.g. channels, through which fluids, e.g. heated liquids or gases, can contact the RBM. In other exemplary embodiments, the engaging portion and/or the frame member is constructed of a material which is relatively transparent to electromagnetic or ultrasonic radiation forming at least part of the atypical conditions, or which is a good conductor of heat, when an increased temperature is at least part of the atypical conditions.
(8) Especially in the first to sixth, ninth and tenth preferred aspects of the invention, the frame member comprises (i) a temple member which has a free end for locating it on a user's head, or (ii) a bridge member having a first end which is secured to an engaging portion of a first lens and a second end which is secured to an engaging portion of a second lens.
(9) Especially in the first to sixth, ninth and tenth preferred aspects of the invention, the frame member extends a short distance from the lens and comprises means for securing it, for example means comprising a hinge, to a temple member which locates the frame on a user's head.
(10) Especially in the first to sixth, ninth and tenth preferred aspects of the invention, the frame member is an attachment member substantially as described in one of the U.S. patents incorporated by reference herein.
(11) Especially in the first to sixth, ninth and tenth preferred aspects of the invention, the engaging portion has at least one dimension which is relatively small adjacent to the periphery of the lens and relatively large remote from the periphery of the lens, for example is generally mushroom-shaped in one dimension
(12) Especially an the first to sixth, ninth and tenth preferred aspects of the invention, the engaging portion is substantially as described in one of the U.S. patents incorporated by reference herein.
(13) Especially in the first to sixth, ninth and tenth preferred aspects of the invention, the lens comprises a plurality of engaging portions.
(14) Especially in the first to sixth, ninth and tenth preferred aspects of the invention, the junction between the body portion and the engaging portion consists essentially of smoothly curved surfaces.

(15) Especially in the aspects of the invention using an RBM, the RBM is an RBA. In some exemplary embodiments, the RBA has one or more of the following characteristics.
  (i) It shrinks by less than 10%, preferably less than 3%, particularly less than 1.5%, by volume and/or linearly, when it is converted from the precursor to the adhesive (since excessive shrinkage of the adhesive on curing can induce stress in the engaging portion and/or the frame member); and/or
  (ii) It is known to those skilled in the art for bonding fiber-optic components; and/or
  (iii) It is a one part adhesive or a two-part adhesive; and/or
  (iv) It adheres to both metals and polymeric materials, for example to a metal frame member and a polymeric engaging portion; and/or
  (v) As a precursor, it comprises 15-40% e.g. 19-30%, of an aliphatic amide, e.g. an amide similar to that having CAS No. 2680-03-7, 10-30%, e.g. 14-25%, of a high boiling acrylate or methacrylate, 0.5-6%, e.g. 1-4%, of a photoinitiator, e.g. a photoinitiator similar to that having the CAS number 947-19-3, 30-55%, e.g. 35-46%, of a urethane acrylic oligomer, and 5-30%, 9-18%, of a vinyl monomer
  (vi) It is one of the adhesives available from Dymax Corp. under the trade name Ultra Light-Weld 3094 Series; and/or
  (vii) It comprises a polymeric matrix and, distributed in the matrix, a material, for example a particulate material, e.g. a ferrite, which generates heat when exposed to selected electromagnetic radiation, e.g. ultraviolet radiation; and/or
  (viii) It is applied to only part of the contacting or adjacent surfaces of the engaging portion and the frame member, for example to less than 70% or less than 50%, e.g. 10-60%, of the area of those surfaces, for example is applied to surfaces which are most rapidly affected by the atypical ambient conditions

(16) Especially in the preferred aspects of the invention making use of atypical ambient conditions, the atypical ambient conditions comprise one or more of
  (a) a temperature greater than 50° C., for example 50 to 150° C., 50 to 100° C., or 60 to 90° C.;
  (b) immersion in a liquid, for example a heated liquid, which may be an aqueous liquid which is free of organic materials; an organic liquid which is free of water and other inorganic materials; or a mixed aqueous/organic liquid;
  (c) immersion in a bath of heated solid particles, e.g. a bath of heated salt particles;
  (d) exposure to electromagnetic radiation outside the visible wavelengths; and
  (e) exposure to ultrasonic radiation.

(17) Especially in the preferred aspects of the invention, the RBM or RCM comprises a member composed of an SMA which has a first shape as a precursor and a second shape in the eyeglass assembly, and which is converted by the atypical ambient conditions into a third shape (which may be the same as or different from the first shape).

(18) The RBM is an RBSMA which is selected so that the frame member will separate from the lens (in the first preferred aspect of the invention) or the RCM will permit the rim to open and release the lens (in the seventh preferred aspect of the invention) when the eyeglasses are subjected to atypical physical deforming forces, thus providing a "breakaway" characteristic which can be desirable, for example in eyeglasses used in sporting activities.

(19) In the aspects of the invention using an RBM, the RBM is an RBS which comprises a matrix and, distributed in the matrix, a material, for example a particulate material, e.g. a ferrite, which generates heat when exposed to selected radiation, e.g. ultraviolet radiation, and (iii) loses physical strength when exposed to said selected radiation. Such an RBS, or any other RBS, can be an adhesive, but need not be an adhesive. If it is not an adhesive, or if its adhesive strength is low, then the engaging portion and the frame member are preferably shaped so that they define a chamber between them which is filled by the RBS so that the RBS provides a mechanical lock which, under typical conditions of use of the eyeglass assembly, prevent the engaging portion and frame member from being pulled apart manually.

(20) In the seventh preferred aspect of the invention, the open ends of the rim comprise location members which help to guide the open ends into a desired position before or while the RCM is put in place.

(21) In the seventh preferred aspect of the invention, one or both of the open ends comprises a physical feature which, when the RCM is an RBSMA, assists in the placement of the RBSMA when the RBSMA is in the form of the precursor and/or assists the correct placement of the RBSMA as it is converted from the precursor into the RBM, and/or maintains the correct placement of the RBSMA after it has been converted into the RBM.

(22) In the seventh preferred aspect of the invention, each of the open ends comprises an aperture, and the RCM comprises
  (i) an RBSMA which enters the apertures as a precursor and is then converted into an RBM which secures the open ends together; the precursor can for example be a pin which comprises an SMA and which is relatively straight and long, and which is converted into a coil which is relatively short; or
  (ii) an RBA or an RBS which enters the apertures as a precursor and is then converted into an RBM which secures the open ends together; the precursor can for example be a rigid pin, composed for example of a metal or a polymeric composition, which is at least partially coated with a precursor for the RBA or RBS; the pin can for example be composed of a material which enhances the efficiency of the atypical conditions and/or be constructed to enhance the efficiency of the atypical conditions, e.g. be composed of a material which transmits a selected wavelength of electromagnetic radiation.

(23) In the seventh preferred aspect of the invention, a part of the rim is a wire.

(24) in the fifth preferred aspect of the invention, the treatment which relieves stresses in at least part of the engaging portion comprises heating the engaging portion, for example with a hot air gun or by immersing the engaging portion in a hot liquid bath, e.g. a hot salt bath of the kind that is often available in premises supplying and/or fitting eyeglasses to users. The treatment can for example be carried out
  (a) before the engaging portion is secured to a frame member, in order to relieve stresses induced in the engaging portion by the method used to shape the engaging portion and/or to secure it to the body portion of the lens; and/or
  (b) after the engaging portion has been secured to a frame member or to an auxiliary member, in order to relieve (i) stresses induced in the engaging portion by the method used to shape the engaging portion and/or to secure it to the body portion of the lens (insofar as any such stresses have not been removed by a treatment as in (a)), and/or (ii) stresses induced in the engaging portion by securing the frame member or auxiliary member to the engaging portion.

(25) In the eighth preferred aspect of the invention, the RBA extends over the whole of the junction between the lens and the rim, or over only a part of the junction (for example 20-80% of the length of the junction), and can be, for example, in the form of a single continuous length, or a relatively small number, e.g. 4-8, of relatively long lengths, or a relatively large number, e.g. 10-20, of relatively short lengths.

(26) In the eighth preferred aspect of the invention, the rim extends around only part of the periphery of the lens, for example 30-60% of the length of the periphery.

DESCRIPTION OF THE DRAWINGS

Figure 2:
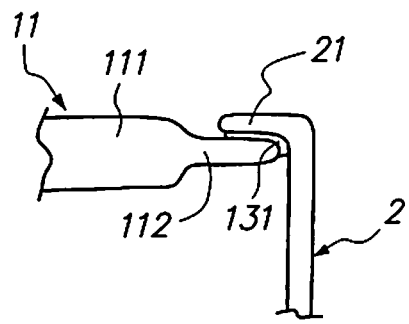
FIGS. 2 and 3 are partial plan and front views of an example of an assembly comprising an eyeglass lens and an eyeglass frame member.
Figure 3:
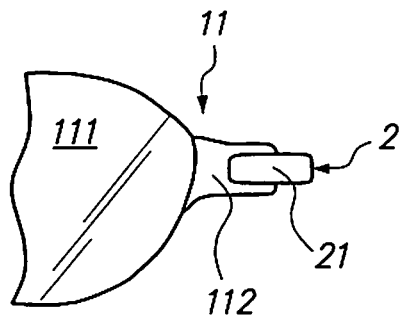
Figure 4:
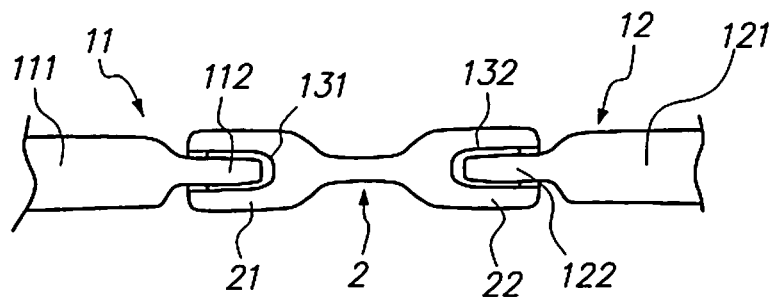
FIG. 4 is a partial plan view of an example of an assembly comprising to eyeglass lenses and an eyeglass frame member.

Referring now to the drawings, in which the same reference numerals are used to denote the same or similar components, FIG. 1 is a partial perspective view of a lens 11 having a body portion 111 and an engaging portion 112 which is integrally connected to the periphery of the body portion and is substantially free of configurations which are stress risers. FIGS. 2 and 3 are partial plan and front views of an assembly comprising a lens as illustrated in FIG. 1 and a frame member 2 having a terminal portion 21 which is secured to the engaging portion 112 by a layer of adhesive 131. FIG. 4 is a partial plan view of an assembly comprising a lens as illustrated in FIG. 1, a similar second lens 12 having a body portion 121 and an engaging portion 122, and a frame member 2 having terminal portions 21 and 22 secured to the engaging portions 112 and 122 respectively.

Figure 5:
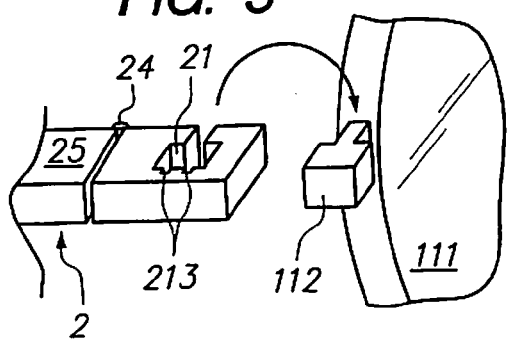
Figure 6:
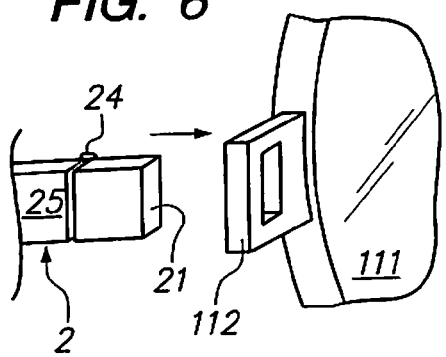
Figure 7:
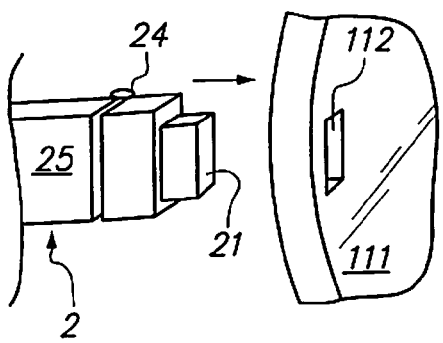
Figure 8:
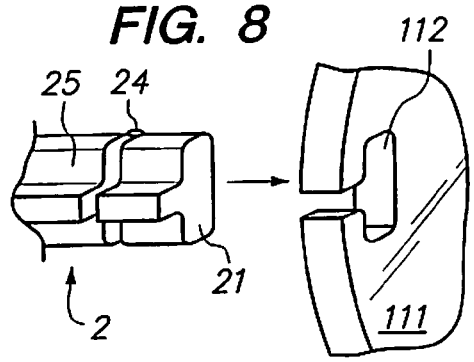
Figure 9:
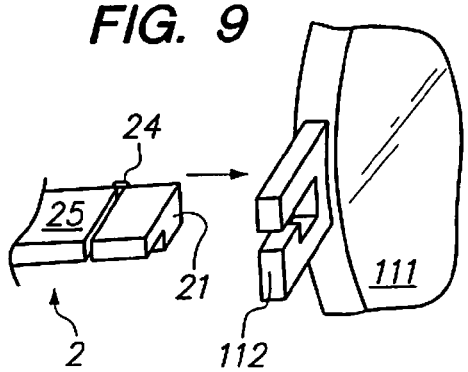
Figure 10:
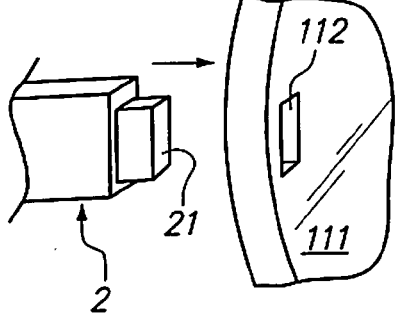
Figure 11:
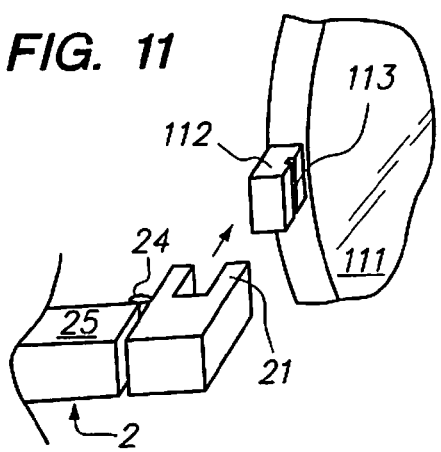
Figure 12:
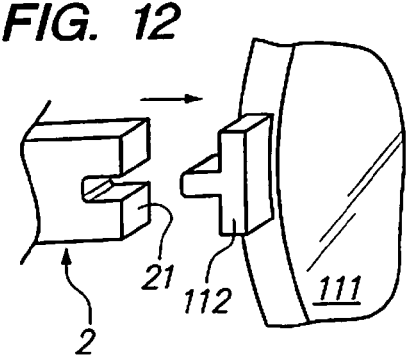

FIGS. 5-12 are partial perspective views of assemblies comprising a lens 1 having a body portion 111 and an engaging portion 112, and a frame member 2 having a corresponding terminal portion 21. In some of these figures, the frame member 2 comprises a temple member 25 which is secured to the frame member 2 by a hinge 24. The assemblies shown in FIGS. 5-12 make use of an RBA which is not shown in the Figures, but which is coated onto at least some of the to-be-contacted surfaces. FIG. 5 shows channels 213 on the frame member, and FIG. 11 shows a channel 113 on the engaging portion, these channels serving to permit release of excess adhesive if the adhesive is coated on the channel-bearing surfaces, and/or to provide access for heated fluid and/or radiation in the atypical ambient conditions.

FIGS. 13 and 14 show frame members comprising a ring 21 which fits into recess 112 in the edge of lens 11 shown in FIG. 15, and can be secured therein by an RBA between some or all of the contacting surfaces. FIG. 16 shows a frame member comprising a ring 21 which fits into recess 112 in the edge of lens 11 shown in FIG. 17 or FIG. 18, and can be secured therein by an RBA between some or all of the contacting surfaces. In alternative embodiments, not shown, the ring 21 is secured by means of a retractable mechanical lock, e.g. a spring-loaded pin which extends from the frame member into a corresponding recess in the lens, or vice versa.

Figure 19:
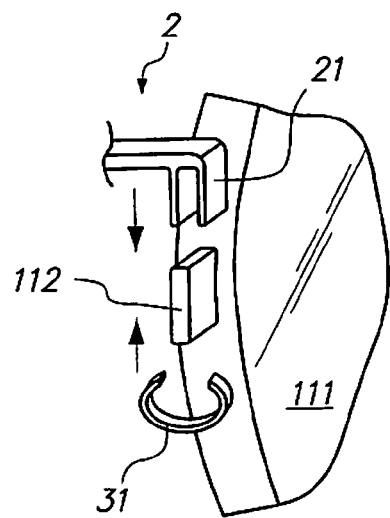
Figure 20:
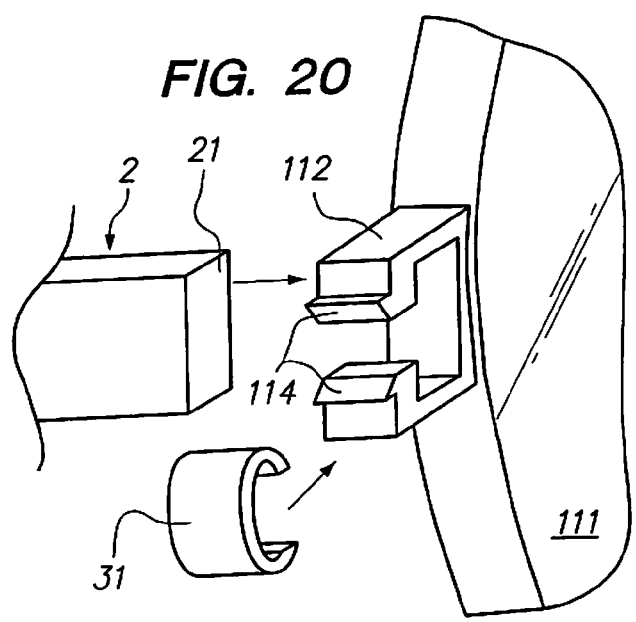
Figure 21:
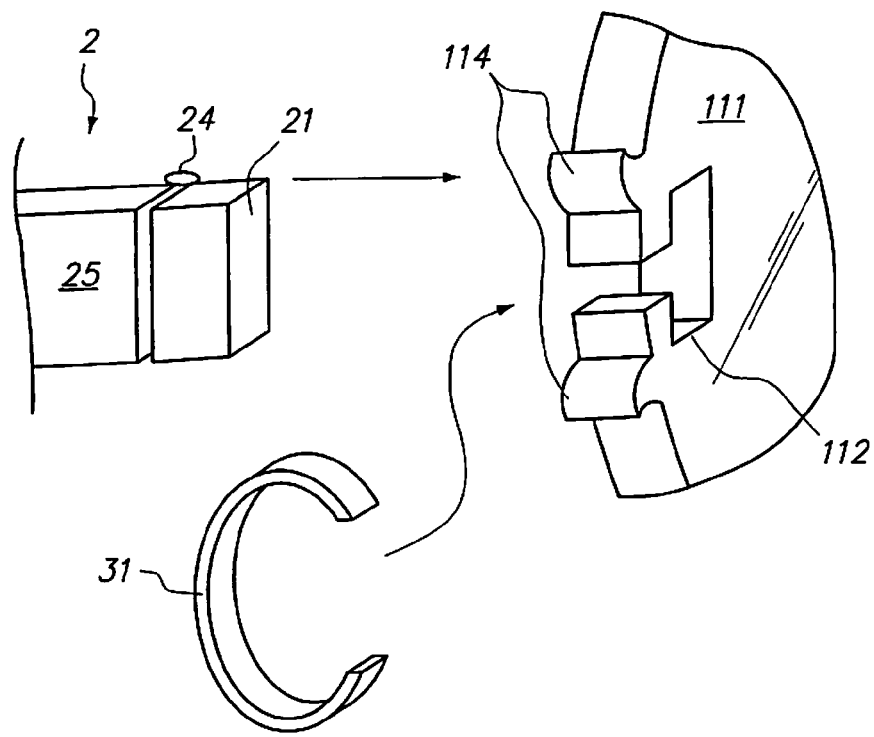

FIGS. 19-24 show assemblies in which the terminal portion 21 of the frame member 2 is secured to the engaging portion 112 of the lens by means of a generally C-shaped RBSMA 31 which in FIG. 19 recovers to cause the elastic deformation of the terminal portion 21 into contact with the engaging portion 112, and in FIGS. 20-21, recovers to cause elastic deformation of the engaging portion into contact with the terminal portion 21. Shown in FIGS. 20 and 21 are ridges 114 which are engaged by the RBSMA as it recovers.

Figure 22:
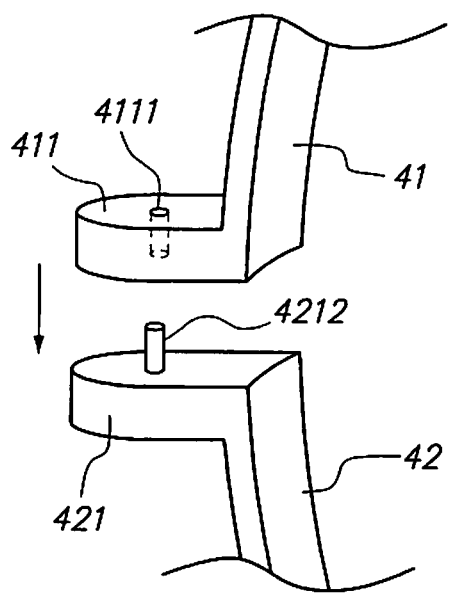
FIG. 22-26 are perspective views of the open ends of a rim for an eyeglass lens.
Figure 23:
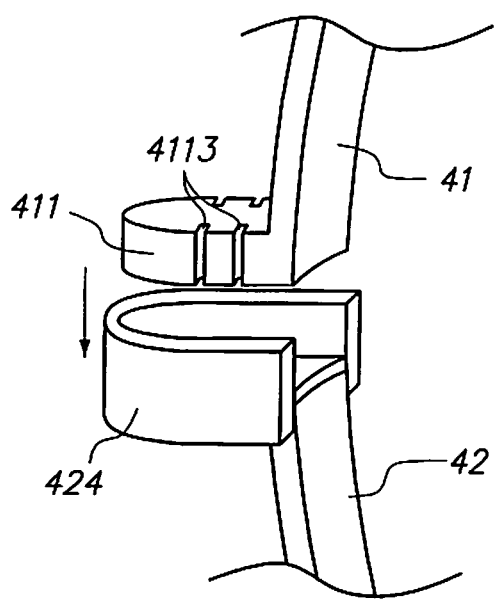
Figure 24:
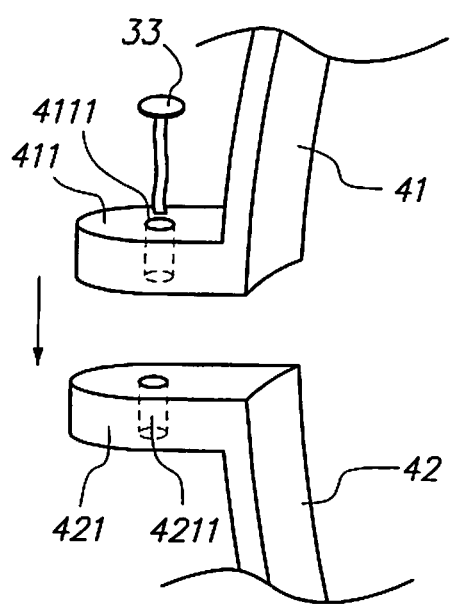
Figure 25:
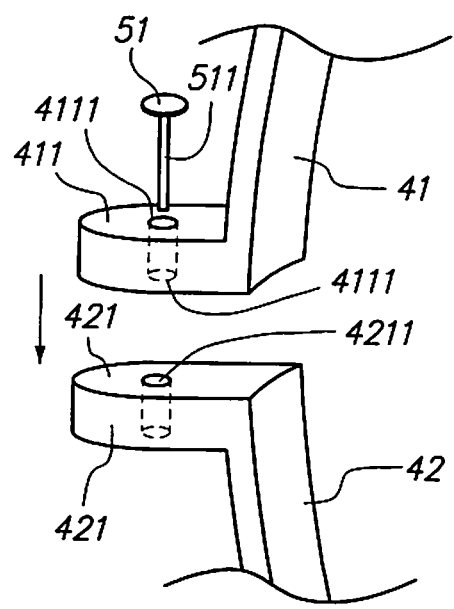
Figure 26:
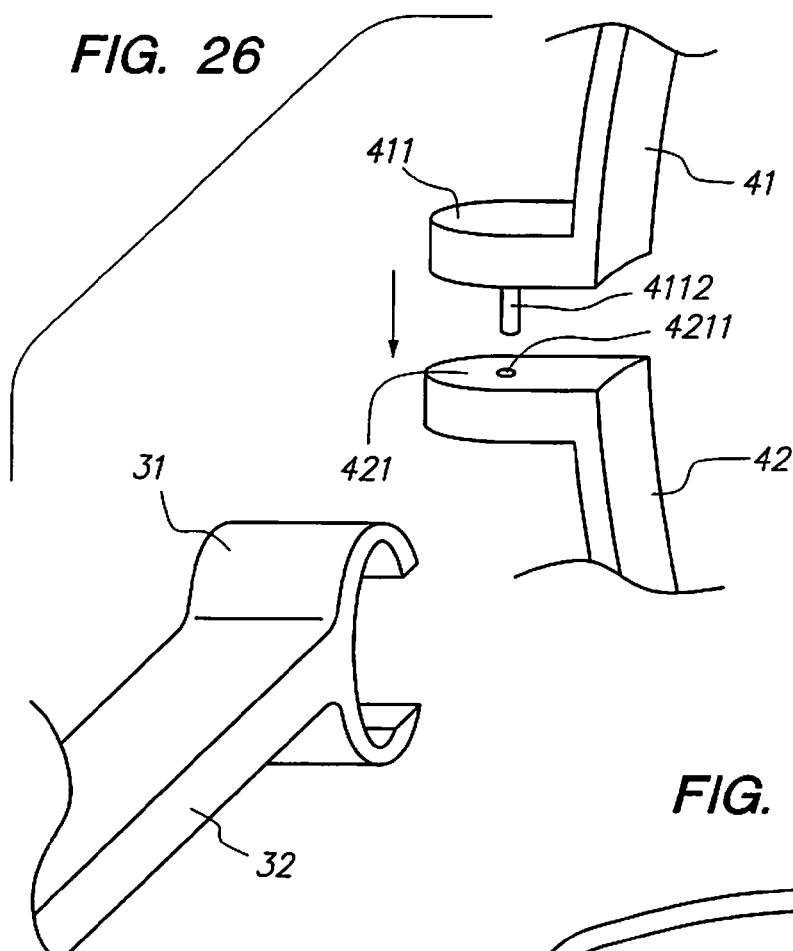

FIGS. 22-26 are partial perspective views of the open ends 41 and 42 of a rim for a lens. Each open end has a lug 411, 412 extending radially from it. For clarity, FIGS. 22-26 do not show the lens, and FIGS. 22-25 do not show the temple member which would normally be attached to one of the open ends 41 and 42. FIG. 22 shows locating pin 422 on the lug of the end 42 and corresponding locating recess 411 in the lug of the end 41. To secure the lens, an RBA precursor (not shown) is placed on one or both of the opposed surfaces of the lugs, and the opposed services are pushed into contact with each other. In FIG. 23, the lug 421 has a collar 424 which guides the lug 411 into the desired position, and which optionally has a base. To secure the lens, an RBA precursor (not shown) is placed on the side surfaces of the lug 411, and the lug 411 is pushed into the collar 424 to a selected depth. Channels 4113 on the side surfaces of the lug 411 permit release of excess adhesive if the adhesive precursor is coated on surfaces adjacent to the channel-bearing surfaces, and/or provides access for heated fluid in the atypical ambient conditions. In FIG. 24, each of the lugs has a hole 4111, 4211 passing through it, and the lugs are secured together by means of a pin 33, at least a part of which is composed of an SMA. The pin 33 has a first, relatively straight, shape as a precursor, so that it can pass through the upper hole 4111 and into, and optionally through, the lower hole 4211. However, when the pin is subjected to selected conditions, it adopts a second shape in which there is an interference fit between the pin and at least the lower hole 4211 and optionally between the pin and the upper hole 4111. FIG. 25 is similar to FIG. 18, except that the lugs are secured together by means of a pin 51 which consists of an RBA or which comprises a substrate, e.g. of a polymer or a metal, and an RBA which is coated on at least part of the shaft 511. FIG. 26 is similar to FIG. 22, except that the lugs are secured by means of a generally C-shaped RBSMA 31 which is one end of a temple member 32. Thus, as noted above, in FIGS. 22-25, there is a conventional temple member, not shown, attached to the end 41 or the end 42, but in FIG. 26 the conventional temple member is replaced by a temple member secured to the RBSMA.

Figure 27:
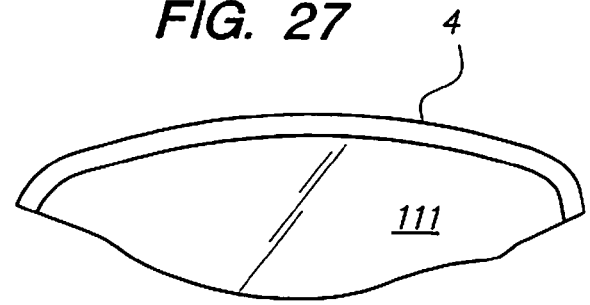
FIGS. 27 and 28 are partial front and cross-sectional views of an eyeglass rim and a lens fitted in the rim.
Figure 28:
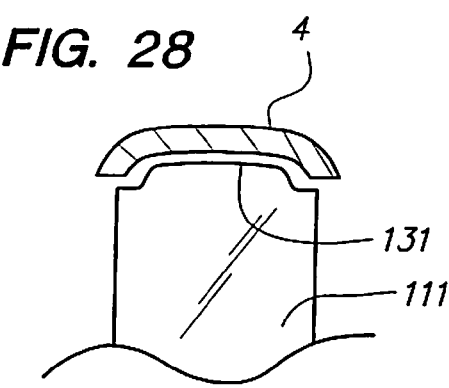

FIG. 27 is a partial front view, and FIG. 28 is a partial cross-sectional view, of an eyeglass assembly comprising a rim 4 to which a lens 111 is attached by a layer of an RBA 131.

The invention claimed is:

1. An eyeglass assembly which comprises
   (1) an eyeglass lens which (a) is composed of a polymeric composition, and (b) comprises a body portion having a periphery and an engaging portion which (i) is integral with the body portion, (ii) extends from the periphery of the lens, or from the front of the lens, or from the back of the lens, and (iii) has no stress risers,
   (2) an eyeglass frame member which is attached to the engaging portion of the eyeglass lens;
   wherein the junction between the body portion and the engaging portion consists essentially of smoothly curved surfaces.

2. An eyeglass assembly according to claim 1 wherein the engaging portion extends from the periphery of the lens.

3. An eyeglass assembly according to claim 2 which comprises
   (3) a removable bonding member (RBM) which
      (i) under typical conditions of use of the assembly, maintains the engaging portion and the frame member in direct or indirect contact with each other, and
      (ii) under selected atypical ambient conditions, undergoes a change which separates the engaging portion and the frame member, or permits the engaging portion and the frame member to be separated from each other by pulling them apart manually.

4. An assembly according to claim 3 wherein the RBM comprises a removable bonding adhesive (RBA) which lies between the engaging portion and the frame member, and whose adhesive strength is reduced by the atypical ambient conditions.

5. An assembly according to claim 3 wherein the RBM comprises a component which comprises a shape memory alloy (SMA) and which changes shape when exposed to the atypical ambient conditions.

6. An assembly according to claim 3 wherein the RBM comprises a solid component which melts when heated under the atypical ambient conditions.

7. An assembly according to claim 6 wherein the RBM comprises a solder.

8. An assembly according to claim 6 wherein the solid component is not an adhesive.

9. An assembly according to claim 8 wherein the engaging portion and the frame member are shaped so that they define a chamber between them which is filled by the solid component so that the solid component provides a mechanical lock which, under typical conditions of use of the eyeglass assembly, prevents the engaging portion and the frame member from being pulled apart manually.

10. A method of making an assembly according to claim 3, the method comprising
  (A) positioning the engaging portion, the frame member, and a precursor of the RBM adjacent to each other; and
  (B) after step (A), converting the precursor of the RBM into the RBM, thus securing the engaging portion and the frame member to each other.

11. A method of disassembling an assembly according to claim 3, the method comprising subjecting the RBM to selected atypical ambient conditions, and separating the engaging portion and the frame member by pulling them apart manually.

12. A method according to claim 11 wherein the atypical ambient conditions comprise one or more of
  (a) a temperature of 50 to 100° C.,
  (b) immersion in a heated liquid,
  (c) exposure to electromagnetic radiation outside the visible wavelengths, and
  (d) exposure to ultrasonic radiation.

13. A method according to claim 11 wherein the atypical ambient conditions comprise immersion in a bath of heated solid particles.

14. A method of making an eyeglass lens which (a) is composed of a polymeric composition, and (b) comprises a body portion having a periphery and an engaging portion which (i) is integral with the body portion, (ii) extends from the periphery of the lens, and (iii) has no stress risers, the method comprising shaping the junction between the body portion and the engaging portion so that the junction consists essentially of smoothly curved surfaces.

15. An eyeglass assembly which comprises
  (1) an eyeglass lens which comprises a body portion and an engaging portion, and
  (2) an eyeglass frame member which is removably attached to the engaging portion by a retractable mechanical lock.

16. An eyeglass assembly according to claim 15 wherein the retractable mechanical lock is a spring-loaded pin which extends from the frame member into a corresponding recess in the engaging portion.

* * * * *